Figure 1:
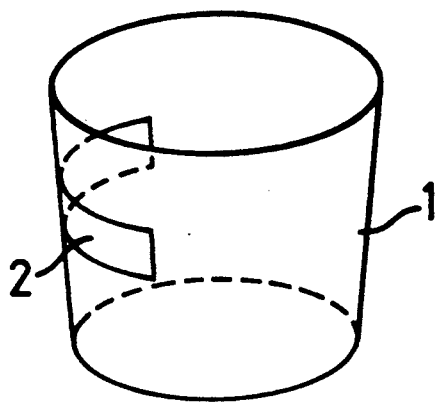

United States Patent [19]

Hope et al.

[11] Patent Number: 5,202,192
[45] Date of Patent: Apr. 13, 1993

[54] ADHESIVE BLENDS AND MULTI-LAYERED STRUCTURES COMPRISING THE ADHESIVE BLENDS

[75] Inventors: Philip S. Hope, Stirling; Peter J. Malley, Clackmannanshire, both of Scotland

[73] Assignee: BP Chemicals Limited, London, England

[21] Appl. No.: 623,757

[22] PCT Filed: May 17, 1990

[86] PCT No.: PCT/GB90/00769
§ 371 Date: Dec. 11, 1990
§ 102(e) Date: Dec. 11, 1990

[87] PCT Pub. No.: WO90/14395
PCT Pub. Date: Nov. 29, 1990

[30] Foreign Application Priority Data

May 19, 1989 [GB] United Kingdom ............... 8911609

[51] Int. Cl.$^5$ .............................................. B32B 27/08
[52] U.S. Cl. .................................. 428/475.8; 428/516; 428/520; 525/74; 525/78
[58] Field of Search .................... 525/74, 78; 428/516, 428/475.8, 520

[56] References Cited

FOREIGN PATENT DOCUMENTS 258990 3/1988 European Pat. Off. .

OTHER PUBLICATIONS

Modern Plastics International, vol. 17, No. 2, Feb. 1987, A. Sternfield: "Versatile VLDPEs Offer Impressive Property Range for Processors", pp. 34–35.

Primary Examiner—Edith Buffalow
Attorney, Agent, or Firm—Brooks Haidt Haffner & Delahunty

[57] ABSTRACT

A polyolefin-containing adhesive blend comprising: (A) 2 to 30 parts by weight of a graft copolymer of a polypropylene backbone grafted with 0.001 to 30% by weight of at least one polymerizable ethylenically unsaturated carboxylic acid or derivative thereof, (B) 10 to 50 parts by weight of a very low density polyethylene and (C) 20 to 80 parts by weight of a polypropylene, the sum of (A), (B) and (C) being 100 parts by weight. The adhesive blend is suitable for bonding polypropylene to polar materials such as ethylene-vinyl alcohol copolymers and nylon. The invention includes multilayer structures produced using the polyolefin-containing adhesive blend.

9 Claims, 1 Drawing Sheet

ADHESIVE BLENDS AND MULTI-LAYERED STRUCTURES COMPRISING THE ADHESIVE BLENDS

The present invention relates to polyolefin-containing adhesive blends and multi-layered structures comprising the adhesive blends.

Polyolefin-containing blends suitable for use as adhesive layers in multi-layered structures are known. For example, Published European Patent Application 0258990 discloses a polyolefin-containing adhesive blend comprising (a) 10 to 30 parts by weight of a graft copolymer of a polypropylene backbone grafted with 0.001 to 30% by weight of at least one polymerisable ethylenically unsaturated carboxylic acid or derivative thereof, (b) 10 to 50 parts by weight of a linear low density polyethylene and (c) 20 to 80 parts by weight of polypropylene, the sum of (a), (b) and (c) being 100 parts by weight. The adhesive blend is suitable for bonding polypropylene to polar materials such as ethylene vinyl alcohol copolymers.

It has now been found that the use of a very low density polyethylene (VLDPE) in place of the linear low density polyethylene (LLDPE) used in the compositions disclosed in EP 0258990 provides an unexpected improvement in adhesive strength when used to bond polypropylene to a polar substrate. This improvement in adhesion is particularly pronounced when the multi-layered structure is retorted.

Food containers are retorted in order to kill bacteria or organisms which may cause premature spoiling of the food. Generally, the process comprises introducing the food into the container, closing the container and heating the closed container in a mixture of steam and air for about half an hour at 121° C. The gases in the free space above the food expand on heating resulting in an increase in pressure within the container, but the retorting is carried out under pressure to maintain equilibrium.

The present invention therefore provides an improved polyolefin-containing adhesive blend and in particular it provides an adhesive blend suitable for bonding polypropylene to a polar substrate which blend has improved adhesion to polypropylene while maintaining good adhesion to the polar substrate, especially when the multi-layered structure is retorted.

Thus, according to the present invention a polyolefin-containing adhesive blend comprises;

(A) 2 to 30 parts by weight of a graft copolymer of a polypropylene backbone grafted with 0.001 to 30% by weight of at least one polymerisable ethylenically unsaturated carboxylic acid or derivative thereof (B) 10 to 50 parts by weight of a very low density polyethylene and (C) 20 to 80 parts by weight of a polypropylene, the sum of (A), (B) and (C) being 100 parts by weight.

The polypropylene used as the backbone of the graft copolymer (A) and the polypropylene blending component (C) can be the same or different and can be a homopolymer or a copolymer of propylene with ethylene, butene or other unsaturated aliphatic hydrocarbons. Such homopolymers and copolymers are known and any such polymer can be used. Blends of two or more polypropylenes can be used. Preferably, if the polypropylene is a copolymer it comprises at least 80% of polymerised propylene units. Preferably, a crystalline polypropylene is used.

Very low density polyethylenes, are known and are copolymers of ethylene with one or more alpha-olefin. Suitable alpha olefins include those having from 3 to 8 carbon atoms such as propylene, butene-1, n-hexene-1, 4-methyl pentene-1 and octene-1. Terpolymers, such as ethylene/propylene/butene copolymer, may be used in the adhesive blend according to the present invention. VLDPEs can be prepared by known processes. VLDPEs have a higher comonomer content and lower density than LLDPEs. Typically, the comonomer content of a VLDPE is from 10 to 25% by weight. The density of a VLDPE can be from 0.86 to 0.91, preferably 0.86 to 0.906 and most preferably 0.86 to 0.900. A mixture of two or more very low density polyethylenes can be used in the adhesive blend according to the present invention.

Polymerisable ethylenically unsaturated carboxylic acids and derivatives thereof include, for example, acrylic acid, methacrylic acid, maleic acid, itaconic acid, citraconic acid, mesaconic acid, maleic anhydride, 4-methyl cyclohex-4-ene-1,2-dicarboxylic acid anhydride, bicyclo (2.2.2) oct-5-ene-2,3-dicarboxylic acid anhydride, 1,2,3,4,5,8,9,10-octahydronaphthalene- 2,3 dicarboxylic acid anhydride, 2-oxa-1,3-diketospiro (4.4) non-7-ene, bicyclo (2.2.1) hept-5-ene-2, 3-dicarboxylic acid anhydride, maleopimaric acid, tetrahydrophthalic anhydride, x-methyl-bicyclo (2.2.1) hept-5-ene -2,3-dicarboxylic acid anhydride, x-methyl-norborn-5-ene-2, 3-dicarboxylic acid anhydride, norborn-5-ene- 2, 3-dicarboxylic acid anhydride. Preferably, maleic anhydride is used. When maleic anhydride is used as the polymerisable ethylenically unsaturated carboxylic acid anhydride, the amount which is graft copolymerised with the polypropylene backbone is typically from 0.01 to 5% by weight.

Co-grafting monomers such as, for example, those described in U.S. Pat. No. 3,882,194 may also be used for preparing the graft copolymers of the present invention.

Methods for preparing graft copolymers are well known and any suitable method can be used to prepare the graft copolymer of polypropylene and polymerisable ethylenically unsaturated carboxylic acid or derivative thereof. One such suitable method comprises blending together the polypropylene and the polymerisable ethylenically unsaturated carboxylic acid or derivative thereof in the presence of a free radical initiator, such as an organic peroxide or hydroperoxide, at a temperature which is above the melting point of the polypropylene and which provides a suitable half-life of the free radical initiator. Suitable free radical initiators are well known. This grafting process can be carried out using known mixing equipment such as, for example, a Brabender mixer, a Banbury mixer or a roll mill. Preferably, the grafting process is carried out in a closed vessel. A convenient method for preparing the graft copolymer is therefore to extrude the polymer backbone, polymerisable ethylenically unsaturated carboxylic acid or derivative thereof and an organic peroxide or hydroperoxide through a single or multiple screw extruder.

The blends of the graft polypropylene, very low density polyethylene and polypropylene can be prepared using known techniques and equipment for batch or continuous blending.

The adhesive blends according to the present invention may also contain additives conventionally used in such compositions such as, for example, antioxidants.

The polyolefin-containing adhesive blends according to the present invention are particularly suitable for bonding polypropylene to a polar material such as, for example, nylon and ethylene vinyl alcohol copolymers (EVOH). Methods for using adhesive compositions to bond polypropylene to polar substrates are known and include lamination, coextrusion, extrusion lamination and coextrusion coating. A preferred use of the polyolefin-containing adhesive blends according to the present invention is to produce multi-layered structures which comprise a layer of polypropylene and a layer of a polar material, particularly ethylene vinyl alcohol copolymers, bonded together with a layer of the polyolefin-containing adhesive blend according to the present invention. The polyolefin-containing adhesive blends according to the present invention will also adhere to metal.

The present invention includes multi-layered structures comprising a first layer comprising a polypropylene composition and a second layer comprising a polar material, the first and second layers being bonded together with an intermediate layer of a polyolefin-containing adhesive blend according to the present invention. In particular, the present invention relates to such multi-layered structures when prepared by co-extrusion e.g. multi-layered film produced by co-extrusion. The polypropylene layer can be any layer comprising a major proportion of a homo-polypropylene or copolymer of propylene. Preferably, the polypropylene layer comprises at least 70% by weight of polymerised propylene units. The second layer comprising a polar material is preferably a layer comprising a major proportion of a polar material selected from the group comprising nylon and ethylene-vinyl alcohol copolymers.

The multi-layered structures according to the present invention can include further layers in addition to the three layers hereinbefore defined. For example, a five-layered structure can comprise a first layer of polypropylene, a second layer of an adhesive composition according to the present invention, a third layer of an ethylene-vinyl alcohol copolymer, a fourth layer of an adhesive composition according to the present invention and a fifth layer of polypropylene.

It has been found that the use of polyolefin-containing adhesive blends of the present invention to produce multi-layered film provides a satisfactory bond when the film is subsequently thermoformed, i.e. the film does not have a tendency to delaminate after thermoforming, e.g. into containers. The present invention includes articles produced by thermoforming a multi-layered film comprising a first layer comprising a polypropylene composition and a second layer comprising a nylon composition or an ethylene-vinyl alcohol copolymer composition, the first layer and the second layer being bonded together by an intermediate layer of a polyolefin containing adhesive blend according to the present invention.

The invention is illustrated by the following examples:

EXAMPLE 1 AND COMPARATIVE COMPOSITION A

A polypropylene/maleic anhydride graft copolymer was prepared by reacting together polypropylene and maleic anhydride in the presence of dicumyl peroxide. The polypropylene used was a powder grade supplied by BP Chimie under the trade name Napryl 62040AP (NAPRYL is a registered trade mark). The polypropylene contained antioxidants. The amount of maleic anhydride used was 1.0% by weight based on the combined weight of maleic anhydride and polypropylene. The amount of dicumyl peroxide used was 1.0% by weight based on the total weight of the reactants. The grafting reaction was carried out in a Buss Co-Kneader PR46 with the barrel temperature set at 160° C. and operated at a hopper setting of 1 and a Kneader screw setting of 1 giving an output of 5 kg/hr.

20 parts by weight of the polypropylene/maleic anhydride copolymer were blended with 30 parts by weight of a very low density polyethylene and 50 parts of a polypropylene to produce an adhesive composition. The blending was carried out in a Werner and Pfleiderer ZSK 30 twin screw extruder. The extruder barrel temperature was set at 200° C. and the screw speed was 150 RPM. The output rate was about 10 kg/hr. The polypropylene was a random copolymer of propylene and ethylene supplied by ICI under the trade name Propathene LSR306 with a melt index of 0.7 g/10 min (PROPATHENE is a trade mark). The very low density polyethylene was supplied by CDF Chimie under the trade name Norsoflex FW1900 with a density of 0.900 g/cm$^3$ and a melt index of 1.0 g/10 mins (NORSOFLEX is a trade mark). For comparison purposes a second blend composition (comparative composition A) was also produced in which the very low density polyethylene was replaced by a linear low density polyethylene (supplied by BP Chimie) with a melt index of 2.5 g/10 mins and a density of 0.920 g/cm$^3$.

The adhesive compositions were used to prepare multi-layered sheets by coextrusion. Each multi-layered sheet comprised a first 550 micron thick layer of a homopolymer polypropylene, supplied by BASF under the trade name Novolen 1102 HX, a second 30 micron thick layer of the adhesive composition, a third 60 micron thick layer of ethylene-vinyl alcohol copolymer, EVOH, supplied by Kuraray under the trade name Eval K, a fourth 30 micron thick layer of the adhesive composition and a fifth 550 micron thick layer of Novolen 1102 HX polypropylene. The multi-layered sheets were subsequently used to manufacture containers using a thermoforming process.

25 mm wide sample strips of the coextruded sheets and container side walls were subjected to a peel test to determine the force required to peel an outer layer of polypropylene from the inner layer of EVOH when the outer polypropylene layer is pulled at 180° from the sample strip using an Instron Universal Testing Machine at a crosshead speed of 100 mm/min. The peel strength, i.e. the steady state load during peel, expressed as g/mm of sample width was determined for several strips.

The peel strengths of the coextruded sheet made from the adhesive composition according to the present invention (Example 1) were at least 320 g/mm and for some samples, the peel strength was so high that the polypropylene layer could not be peeled from the EVOH layer. The peel strengths determined for the coextruded sheet made from comparative composition A range from 70 to a maximum of 140 g/mm. The average peel strengths of the samples cut from the container side walls were 40 g/mm for the composition according to the present invention (Example 1) but only 20 g/mm for the comparative composition A.

Figure 3:
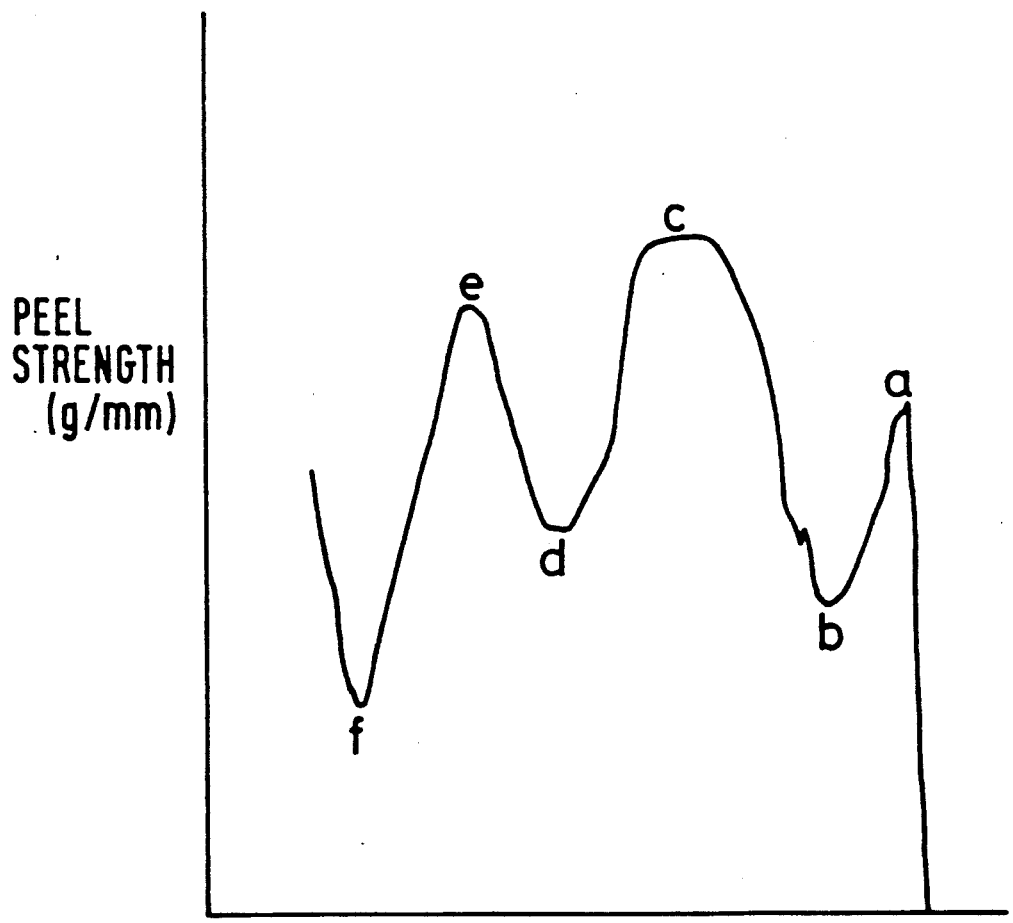

EXAMPLE 2 AND COMPARATIVE COMPOSITION B to (f) are used to designate the peaks and troughs in the peel strengths as illustrated in FIG. 3.

TABLE 1

| | | Peel Strength g/mm | | | | | | | | | | | | |
|---|---|---|---|---|---|---|---|---|---|---|---|---|---|---|
| | | Thermoformed Containers | | | | | | | | | | | | |
| | | Before Retorting | | | | | | | After Retorting | | | | | |
| Adhesive | Coextruded | Machine Direction | | | | | | Hoop | Machine Direction | | | | | Hoop |
| Composition | Sheet | a | b | c | d | e | f | Direction | a | b | c | d | e | f | Direction |
| Example 2 | 210–340 | 170 | 60 | 260 | 70 | 150 | 40 | 140 | 115 | 40 | 250 | 50 | 180 | 30 | 70 |
| Comparative Composition B | 60–160 | 140 | 30 | 220 | 50 | 140 | 20 | 100 | 60 | 20 | 120 | 30 | 70 | 10 | 35 |

A polypropylene/maleic anhydride graft copolymer was prepared by reacting together polypropylene and maleic anhydride in the presence of 1,3-bis-(t-butyl-peroxy isopropyl) benzene. The polypropylene used was the same as that used in Example 1. The maleic anhydride was used in a 50/50 polypropylene/maleic anhydride powder concentrate form and was supplied by AKZO Chemicals under the trade name Nourymix MA915 (NOURYMIX is a trade mark). The amount of Nourymix concentrate used was 2.0% by weight based on the combined weight of Nourymix and polypropylene, equivalent to 1% by weight maleic anhydride addition. The amount of 1,3-bis(t-butylperoxy isopropyl) benzene used was 0.4% by weight based on the total weight of the reactants. The grafting reaction was carried out in a Warner and Pfleiderer ZSK30 corotating twin screw extruder with a barrel set temperature of 180° C. and operated with a screw speed of 200 RPM at an output of 6–8 kg/hr.

20 parts by weight of the polypropylene/maleic anhydride copolymer were blended with 30 parts of a very low density polyethylene and 50 parts of a polypropylene to produce an adhesive composition. The very low density polyethylene and polypropylene grades were the same as those used in Example 1. A composition (Comparative Composition B) was produced in which the very low density polyethylene was replaced by the same linear low density polyethylene as used in Comparative Composition A.

Figure 2:
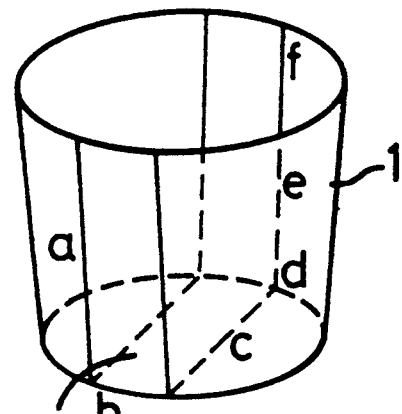

The adhesive compositions were used to prepared multi-layered sheets by coextrusion as for Example 1 and Comparative Composition A. The multi-layered sheets were subsequently used to manufacture containers using a thermoforming process. Some of the thermoformed containers were retorted by being filled with water and then subjected to heating at 121° C. with steam for 40 minutes. 25 mm wide sample strips were cut from the thermoformed containers to enable the peel strengths to be determined in both the machine direction and hoop direction. FIG. 1 shows a container 1 and illustrates where the sample strip 2 was obtained for the determination of peel strength in the hoop direction. FIG. 2 also shows a container 1 and illustrates where the sample strip 3 was obtained for the determinations of peel strength in the machine direction. The peel strength in the machine direction varied according to position in the thermoformed container. FIG. 3 illustrates a typical trace obtained from a machine direction sample showing how the peel strength varied with position. The peaks and troughs in the trace have been identified by the letters a, b, c, d, e and f and the approximate positions in the container are indicated in FIG. 2.

The peel strengths for Example 2 and the Comparative Composition B are given in Table 1. The letters (a)

EXAMPLE 3 AND COMPARATIVE COMPOSITION C 10 parts by weight of a commercially available polypropylene/maleic anhydride graft copolymer were blended with 30 parts by weight of a very low density linear polyethylene and 60 parts of a polypropylene to produce an adhesive composition. The very low density polyethylene and polypropylene were the same as those used in Example 1. The adhesive composition was produced on a Werner and Pfleiderer ZSK30 co-rotating twin screw extruder using the same process conditions as used in Example 1. A composition in which the very low density polyethylene was replaced by the same linear low density polyethylene as used in Comparative Composition A was produced for comparison (Comparative Composition C).

The adhesive compositions were used to prepare multi-layered sheets by coextrusion as for Example 1. Thermoformed containers were produced from these sheets and some containers were subjected to the same heat treatment as in Example 2. The force required to peel the outer polypropylene layers from the EVOH inner layer was measured in the same manner as in Example 2. The peel strengths are given in Table 2.

EXAMPLE 4 AND 5 AND COMPARATIVE COMPOSITIONS D TO J

A polypropylene/maleic anhydride graft copolymer was prepared by reacting together polypropylene and maleic anhydride in the presence of 1,3-bis-(t-butylperoxy isopropyl) benzene. The polypropylene used was a powder grade supplied by APPRYL Chimie under the trade name Appryl 3003p (APPRYL is a registered trade name). The maleic anhydride was used in a 50/50 polypropylene/maleic anhydride concentrate form and was supplied by AKZO Chemicals under the trade name Nourymix MA915 (Nourymix is a trade mark). The amount of Nourymix concentrate used was 2.0% by weight based on the combined weight of Nourymix and polypropylene, equivalent to 1% by weight maleic anhydride addition. The amount of 1,3-bis-(t-butylperoxy isopropyl) benzene used was 0.4% by weight based on the total weight of the reactants. The grafting reaction was carried out in a Werner and Pfleiderer ZSK30 corotating twin screw extruder with a barrel set temperature of 180° C. and operated with a screw speed of 200 RPM at an output of 6–8 kg/hr.

20 parts by weight of the polypropylene/maleic anhydride copolymer were blended with 30 parts by weight of a polyethylene component and 50 parts by weight of a polypropylene to produce an adhesive composition. The blending was carried out in a Werner and Pfleiderer ZSK30 twin screw extruder. The extruder barrel temperature was set at 200° C. and the screw speed was 150 RPM. The output rate was about 10 kg/hr. The polyproplene grade was the same as that used in Example 1. A range of polyethylene components was used with various densities (Table 3).

The adhesive compositions were used to produce multilayer sheets by laboratory sandwich mouldings and coextrusion. The coextruded sheet was subsequently used to manufacture containers by a thermoforming process.

Laboratory sandwich mouldings were prepared comprising two layers of EVOH bonded together by a layer of the adhesive composition. The EVOH was supplied by Kuraray under the trade name Eval K. All of the sandwich mouldings were prepared by compression moulding separate layers of the materials in the form of sheets, each of which measured 150 mm × 150 mm × 120 microns. The sandwich compression moulding was carried out by preheating the mould to 200° C. placing the required three sheets of material in the mould, heating to 200° C. for 30 seconds under no pressure, increasing the load to 10 tons for 10 seconds and then cooling under load. The sandwich mouldings were cut into 25 mm wide strips and the average force to separate an EVOH layer from the sandwich was measured using an Instron Universal Testing Machine at a crosshead speed of 100 mm/min. The adhesive strength i.e. the steady state load during peel, expressed as g/mm of sample width was determined for several strips and is given in Table 3.

Each coextruded multilayer sheet comprised a first 550 micron thick layer of polypropylene (Novalen 1102 HX), a second 30 micron thick layer of the adhesive composition, a third 60 micron thick layer of EVOH (Eval K), a fourth 30 micron thick layer of the adhesive composition and a fifth 550 micron thick layer of polypropylene (Novolen 1102 HX). 25 mm wide samples of the coextruded sheet and container sidewall (hoop direction, unretorted) were subjected to a peel test to determine the force required to peel an outer layer of polypropylene from the inner layer of EVOH when the outer polypropylene layer is pulled at 180° from the sample strip using an Instron tensile testing machine at a crosshead speed of 100 mm/min. The peel strength, i.e. the stead load during peel, expressed as g/mm of sample width was determined for several strips. The peel strengths for both the coextruded sheet and thermoformed containers are presented in Table 3.

Of all the adhesive compositions produced it is only those containing VLDPE that maintain excellent adhesion in laboratory, coextrusion and container multilayer structures.

TABLE 2

| | | Peel Strength g/mm | | | | | | | | | | | | | |
|---|---|---|---|---|---|---|---|---|---|---|---|---|---|---|---|
| | | | | | | | Thermoformed Containers | | | | | | | | |
| | | Before Retorting | | | | | | After Retorting | | | | | | | |
| Adhesive | Coextruded | Machine Direction | | | | | Hoop | Machine Direction | | | | | | Hoop |
| Composition | Sheet | a | b | c | d | e | f | Direction | a | b | c | d | e | f | Direction |
| Example 3 | 100–440 | 160 | 120 | 260 | 110 | 160 | 90 | 130 | 100 | 70 | 150 | 80 | 160 | 30 | 65 |
| Comparative Composition C | 160–360 | 140 | 70 | 240 | 80 | 150 | 70 | 90 | 40 | 30 | 50 | 30 | 40 | 25 | 40 |

TABLE 3

ADHESION RESULTS FOR VARIOUS ADHESIVE COMPOSITIONS IN LABORATORY TESTS, COEXTRUDED SHEET AND THERMOFORMED CONTAINERS
All adhesive compositions contain: 20% MAHgPP, 30% Polyethylene, 50% Polypropylene copolymer

| Adhesive composition | Polyethylene type (density g/cm³) | Adhesion for lab. sandwich mouldings g/mm | Peel strength coex. sheet g/mm | Peel strength therm. conts. g/mm |
|---|---|---|---|---|
| Comparative Composition D | LLDPE LL0209AA (0.920) | CNP | 220 (140) | 8 |
| Comparative Composition E | LLDPE LL7209 (0.920) | 180-TEAR | 370 (210) | 6 |
| Comparative Composition F | LLDPE DOWLEX 2056 (0.920) | 180-TEAR | 130 (120) | 18 |
| Comparative Composition G | LLDPE NESTE 8666 (0.924) | 120-TEAR | 100 (90) | 8 |
| Comparative Composition H | LDPE LD5310 (0.920) | 180 | 60 (40) | 18 |
| Comparative Composition I | LDPE LE1810AA (0.930) | 100 | 50 (40) | 4 |
| Comparative Composition J | HDPE HD6007 (0.960) | 10 | 30 (30) | 4 |
| Example 4 | VLDPE NORSOFLEX FW1900 (0.900) | CNP | 330 (220) | 25 |
| Example 5 | VLDPE NORSOFLEX LW2550 (0.885) | 240-TEAR | 240 (150) | 40 |

CNP = could not peel the layers apart
( ) = results in brackets have been corrected to take into account the angle of peel
LLDPE = linear low density polyethylene
HDPE = high density polyethylene
LDPE = low density polyethylene
VLDPE = very low density polyethylene
MaHgPP = Maleic anhydride grafted polypropylene
The above results are averages based on 8 samples tested.

We claim:
1. A polyolefin-containing adhesive blend comprising;

(A) 2 to 30 parts by weight of a graft copolymer of a polypropylene backbone grafted with 0.001 to 30% by weight of at least one polymerisable ethylenically unsaturated carboxylic acid or derivative thereof, (B) 10 to 50 parts by weight of a very low density polyethylene and (C) 20 to 80 parts by weight of a polypropylene the sum of (A), (B) and (C) being 100 parts by weight.

2. A polyolefin-containing adhesive blend as claimed in claim 1 in which the polymerisable ethylenically unsaturated carboxylic acid or derivative thereof is selected from the group consisting of acrylic acid, methacrylic acid, maleic acid, maleic anhydride itaconic acid, citraconic acid, mesaconic acid, 4-methyl cyclohex-4-ene-1, 2-dicarboxylic acid anhydride, bicyclo (2.2.2) oct-5-ene-2, 3-dicarboxylic acid anhydride, 1, 2, 3, 4, 5, 8, 9, 10-octahydro-naphthalene-2, 3 dicarboxylic acid anhydride, 2-oxa-1, 3-di ketospiro (4.4) non-7-ene, bicyclo (2.2.1) hept-5-ene-2, 3-dicarboxylic acid anhydride, maleopimaric acid, tetrahydrophthalic anhydride, x-methyl-bicyclo (2.2.1) hept-5-ene-2, 3-dicarboxylic acid anhydride, x-methylnorborn-5-ene-2, 3-dicarboxylic acid anhydride, norborn-5-ene-2, 3-dicarboxylic acid anhydride.

3. A polyolefin-containing adhesive blend as claimed in claim 1 in which the polymerisable ethylenically unsaturated carboxylic acid or derivative thereof is maleic anhydride.

4. A multi-layered structure comprising a first layer comprising a polypropylene composition and a second layer comprising a polar material, the first layer and the second layer being bonded together with an intermediate layer of a polyolefin-containing adhesive blend as claimed in any one of claims 1 to 3.

5. A multi-layered structure as claimed in claim 4 in which the multi-layered structure is a film produced by co-extrusion.

6. A multi-layered structure as claimed in claim 4 in which the second layer comprising a polar material comprises a major proportion of a polar material selected from the group consisting of nylon and ethylene-vinyl alcohol copolymers.

7. A multi-layered structure comprising a first layer comprising a homopolymer or copolymer of propylene and a second layer comprising an ethylene vinyl alcohol copolymer, the first layer and the second layer being bonded together with an adhesive blend comprising;

(A) 2 to 30 parts by weight of a graft copolymer of a polypropylene backbone grafted with 0.01 to 5% by weight of maleic anhydride, (B) 10 to 50 parts by weight of a very low density polyethylene and (C) 20 to 80 parts by weight of a polypropylene the sum of (A), (B) and (C) being 100 parts by weight.

8. A multi-layered structure comprising a first layer comprising a homopolymer or copolymer of propylene, a second layer of an adhesive composition, a third layer of an ethylene-vinyl alcohol copolymer, a fourth layer of an adhesive composition and a fifth layer of a homopolymer or copolymer of propylene in which the adhesive composition is a polyolefin-containing adhesive blend as claimed in any one of claims 1 to 3.

9. An article produced by thermoforming a multi-layered film which film comprises a first layer comprising a polypropylene composition and a second layer comprising a nylon composition or an ethylene-vinyl alcohol copolymer composition, the first layer and second layer being bonded together by an intermediate layer of a polyolefin-containing adhesive blend as claimed in any one of claims 1 to 3.

* * * * *